US008262050B2

(12) United States Patent  (10) Patent No.: US 8,262,050 B2
Linz  (45) Date of Patent: Sep. 11, 2012

(54) METHOD AND APPARATUS FOR MOUNTING AND DISMOUNTING AN AIRCRAFT ENGINE

(75) Inventor: Mark Linz, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 645 days.

(21) Appl. No.: 12/343,848

(22) Filed: Dec. 24, 2008

(65) Prior Publication Data

US 2010/0155566 A1 Jun. 24, 2010

(51) Int. Cl.
 *F16M 13/00* (2006.01)
(52) U.S. Cl. ............. 248/554; 244/54; 248/646; 269/17
(58) Field of Classification Search .................. 248/554,
 248/555, 556, 557, 646, 657, 669; 29/700;
 244/54, 53 R, 110 B; 60/226.2, 796, 797;
 269/17
 See application file for complete search history.

(56) References Cited

U.S. PATENT DOCUMENTS

| | | | |
|---|---|---|---|
| 4,326,682 A | 4/1982 | Nightingale | |
| 4,440,265 A * | 4/1984 | Spagnoli | 182/129 |
| 4,825,648 A | 5/1989 | Adamson | |
| 4,989,406 A | 2/1991 | Vdoviak et al. | |
| 5,174,525 A | 12/1992 | Schilling | |
| 5,190,245 A | 3/1993 | Debeneix | |
| 5,284,011 A | 2/1994 | Von Benken | |
| 5,524,847 A | 6/1996 | Brodell et al. | |
| 5,746,391 A * | 5/1998 | Rodgers et al. | 244/54 |
| 5,816,367 A * | 10/1998 | Lilja et al. | 187/244 |
| 6,000,903 A * | 12/1999 | Hatch et al. | 414/778 |
| 6,223,524 B1 | 5/2001 | Durcan | |
| 6,360,989 B1 | 3/2002 | Maguire | |
| 6,398,161 B1 | 6/2002 | Jule et al. | |
| 6,401,448 B1 | 6/2002 | Manteiga et al. | |
| 7,063,290 B2 * | 6/2006 | Marche | 244/54 |
| 7,175,168 B2 * | 2/2007 | Hardaker et al. | 269/17 |
| 7,938,359 B2 | 5/2011 | Guibert et al. | |
| 2008/0023618 A1 * | 1/2008 | McGloghlon | 248/646 |
| 2008/0126889 A1 * | 5/2008 | Barnes et al. | 714/704 |
| 2009/0255271 A1 | 10/2009 | Vauchel et al. | |
| 2009/0278021 A1 * | 11/2009 | Jimeno De La Torre | 248/554 |
| 2010/0040466 A1 | 2/2010 | Vauchel et al. | |
| 2010/0052288 A1 * | 3/2010 | Doll et al. | 280/404 |
| 2011/0127369 A1 | 6/2011 | Dussol et al. | |

FOREIGN PATENT DOCUMENTS

EP 361901 4/1990

* cited by examiner

*Primary Examiner* — Ramon Ramirez
(74) *Attorney, Agent, or Firm* — General Electric Company; David J. Clement; William S. Andes

(57) ABSTRACT

Apparatus and method for removing an aircraft engine. A method includes mounting a frame assembly in supported connection with a support member of an associated aircraft. The frame assembly includes a frame member, a movable assembly mounted in movable relationship to the frame member, and a plurality of engine winches mounted in supported connection with the movable member. Each engine winch has an associated engine cable operably connected thereto. The movable assembly is movable between forward and rearward positions. The method further includes supporting the weight of at least a portion of an aircraft engine with the engine cables and moving the movable member relative to the frame member to displace the portion of the aircraft engine.

10 Claims, 9 Drawing Sheets

METHOD AND APPARATUS FOR MOUNTING AND DISMOUNTING AN AIRCRAFT ENGINE

This invention relates generally to aircraft engine assemblies, and more specifically to methods and apparatuses for mounting and dismounting aircraft engines.

Large turbofan gas turbine engines may be considered ready for installation on an associated aircraft when the fan module and inlet are assembled to the remaining engine components. During engine service, the fan module and inlet may remain attached to the engine components, although the turbofan overhaul practices typically involve refurbishment of the core module of the engine with limited need for fan module work. Thus, removal of the fan module during the engine overhaul process leads to wasted shop floor space. Additionally, shipment of the engine may require removal of the inlet and often the fan module due to cargo aircraft door opening restrictions and roadway obstructions.

Accordingly, it would be desirable to provide engine structures and mounting/dismounting methods that reduce the shop floor space required for engine overhaul and facilitate shipment of engine components.

BRIEF DESCRIPTION OF THE INVENTION

Exemplary embodiments disclosed herein provide methods and apparatuses for mounting and dismounting gas turbine engines from associated aircraft.

In one exemplary embodiment, an apparatus includes a frame assembly configured for mounting to support structure of an associated aircraft. The frame assembly comprises a frame member, a movable assembly mounted in movable relationship to the frame member, wherein the movable assembly is movable between forward and rearward positions, and a plurality of engine winches mounted in supported connection with the movable member. Each engine winch has an associated engine cable operably connected thereto. The frame assembly is operable to movably support at least a portion of an associated aircraft engine.

In an exemplary embodiment, a method includes mounting a frame assembly in supported connection with a support member of an associated aircraft. The frame assembly includes a frame member, a movable assembly mounted in movable relationship to the frame member, wherein the movable assembly is movable between forward and rearward positions, and a plurality of engine winches mounted in supported connection with the movable member. Each engine winch has an associated engine cable operably connected thereto. The method also includes supporting the weight of at least a portion of an aircraft engine with the engine cables, and moving the movable member relative to the frame member to displace the portion of the aircraft engine.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Exemplary embodiments disclosed herein are directed to methods and apparatuses for removing or installing a gas turbine engine. In general terms, the gas turbine engine is adapted for supported connection with a monolithic structure that is semi-permanently attached to an associated aircraft. An exemplary monolithic structure is shown and described in copending patent application Ser. No. 12/343,833, filed Dec. 24, 2008, the entirety of which is incorporated herein by reference. It is envisioned that the methods and apparatuses described herein may be readily adapted for use with other engine-to-aircraft supporting structures by those having skill in the relevant art.

Figure 1:
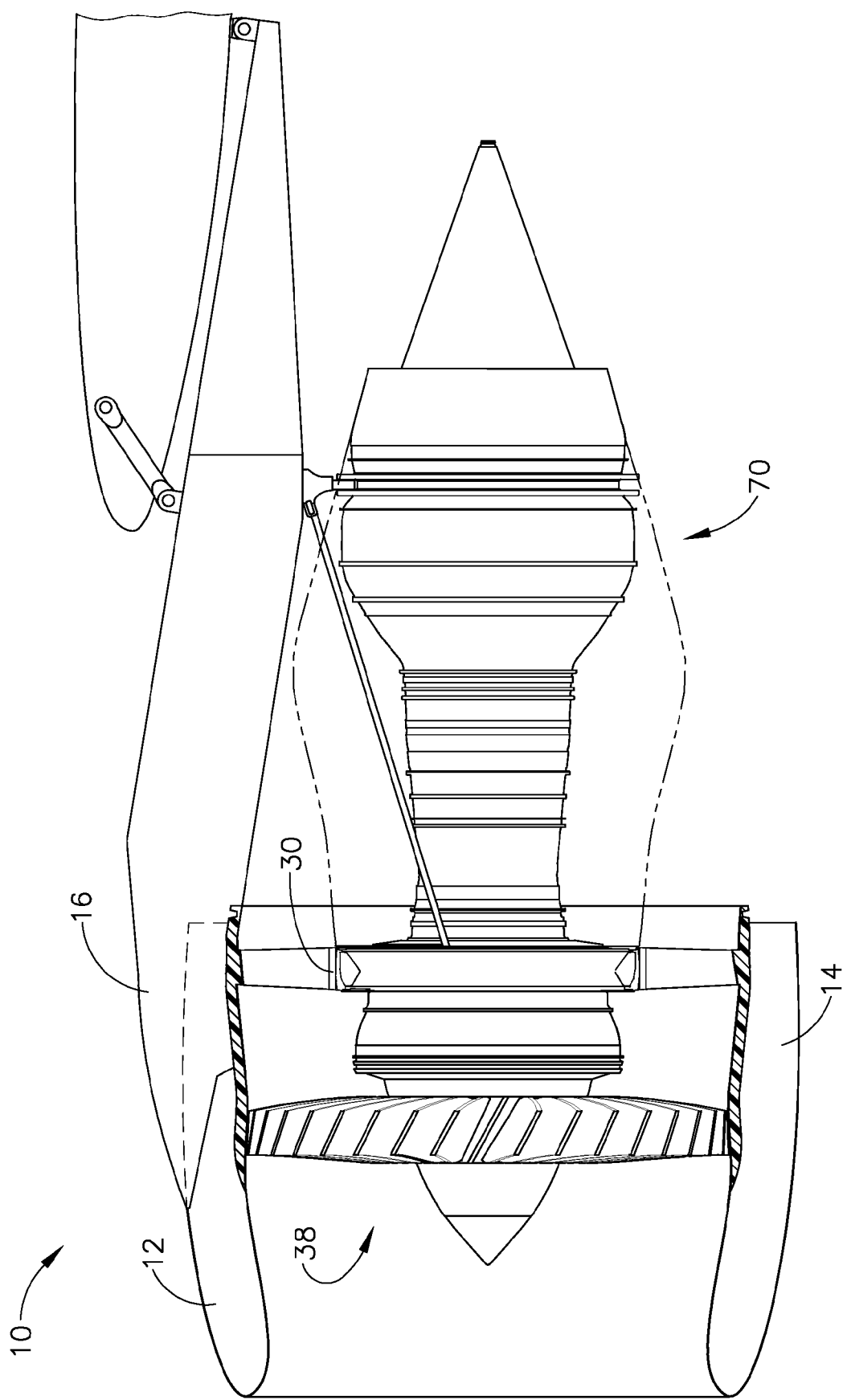
FIG. 1 is a side view, partly in section, of an exemplary embodiment of an assembly showing a monolithic structure and a gas turbine engine assembly.

With reference to FIG. 1, there is provided an assembly 10 including an exemplary monolithic structure 12 and a gas turbine engine assembly 70. The exemplary monolithic structure 12 includes a nacelle portion 14 arranged and dimensioned for encircling at least a portion of a gas turbine engine assembly, notably the fan assembly 38. The exemplary nacelle portion 14 is integral with an axially extending support structure portion 16. The exemplary support structure portion 16 is arranged and dimensioned for supporting the weight of the engine, and for reacting and transmitting static and dynamic loads to the associated aircraft. In an exemplary embodiment, a portion of an installed gas turbine engine extends through a ring member 30 disposed in the nacelle portion 14 of the monolithic structure 12.

In an exemplary embodiment, the gas turbine engine assembly 70 is disengaged or dismounted from an associated aircraft 13 while the exemplary monolithic structure 12 remain mounted thereto. With reference to FIGS. 2-9, in general terms, a frame assembly 40 is utilized to facilitate the removal of an installed gas turbine engine. The exemplary frame assembly 40 attaches to a support member 34 which may comprise the support structure portion 16 of the exemplary monolithic structure 12. Those having skill in the art will appreciate that the exemplary frame assembly 40 may be utilized in conjunction with a conventional pylon or support strut. Following removal of at least a portion of the fan assembly 38, the weight of the remainder of the engine is transferred from the support member 34 to the frame assembly 40 via forward and rear engine cables 55, 57, respectively. The exemplary frame assembly 40 facilitates rearward movement of the remainder of the gas turbine engine, herein referred to as the core engine 41. When the engine has been sufficiently displaced, a cart or trolley 80 is raised to meet the core engine 41. In an exemplary embodiment, the entire cart or trolley is raised off the ground as illustrated in the accompanying figures. Those with skill in the art will appreciate that an alternative cart or trolley may instead be fitted with a vertically displaceable cradle or other structure that may be raised toward the engine while a body of the cart or trolley remains on the ground. In an exemplary embodiment, the weight of the engine is transferred to the cart or trolley 80 and the trolley/engine assembly 90 is then lowered to the ground. In an exemplary embodiment, the monolithic structure 12 remains installed on the associated aircraft. The core engine 41 is thus ready for service or shipment. In an exemplary embodiment, the trolley/engine assembly 90 is sufficiently sized and dimensioned to fit within a standard shipping container. Because the inlet/fan case assembly does not remain attached to the engine as in prior engine service removals, less shop floor space is required. The proceeding description provides a general background of the invention disclosed herein. Exemplary embodiments are described with greater specificity below.

Figure 2:
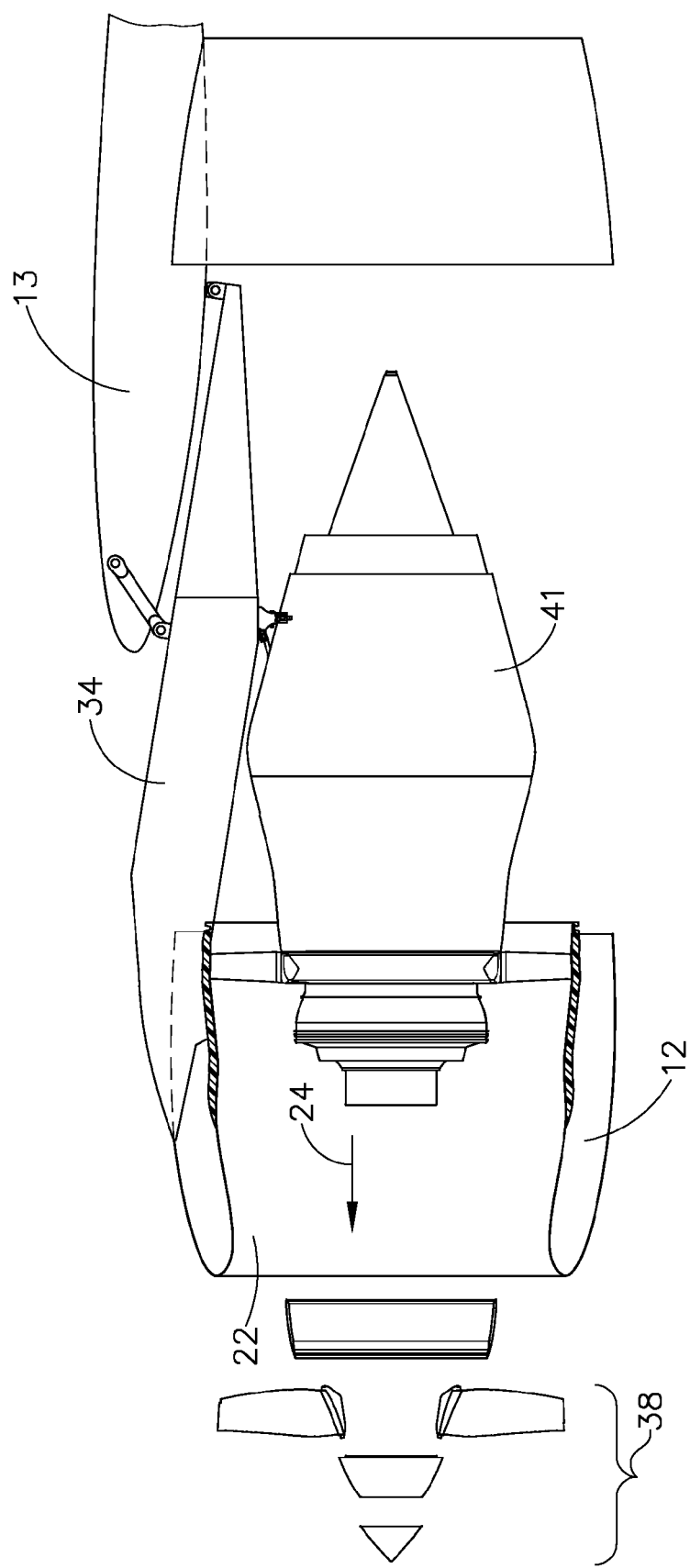
FIG. 2 is a side view, partly in section, of an exemplary monolithic structure and gas turbine illustrating partial disassembly and removal of a gas turbine engine.

With particular reference to FIG. 2, in an exemplary embodiment, a fan assembly 38 may be disassembled from a core engine 41. For ease of illustration, certain elements of the fan assembly are shown in an exploded view; however, complete disassembly of the fan assembly members is not required for purposes of the invention. The fan assembly 38 is removed from the core engine through a forward or inlet region 22 of the monolithic structure 12, as indicated by Arrow 24. In an exemplary embodiment, a booster outer case 25 may also be removed. When present, all or a portion of a thrust reverser assembly or other aero structures may be moved or removed to permit access to the core engine. In certain exemplary embodiments, all or a portion of the core case may be removed. For ease of illustration, the core case is not shown in the accompanying drawings.

Figure 3:
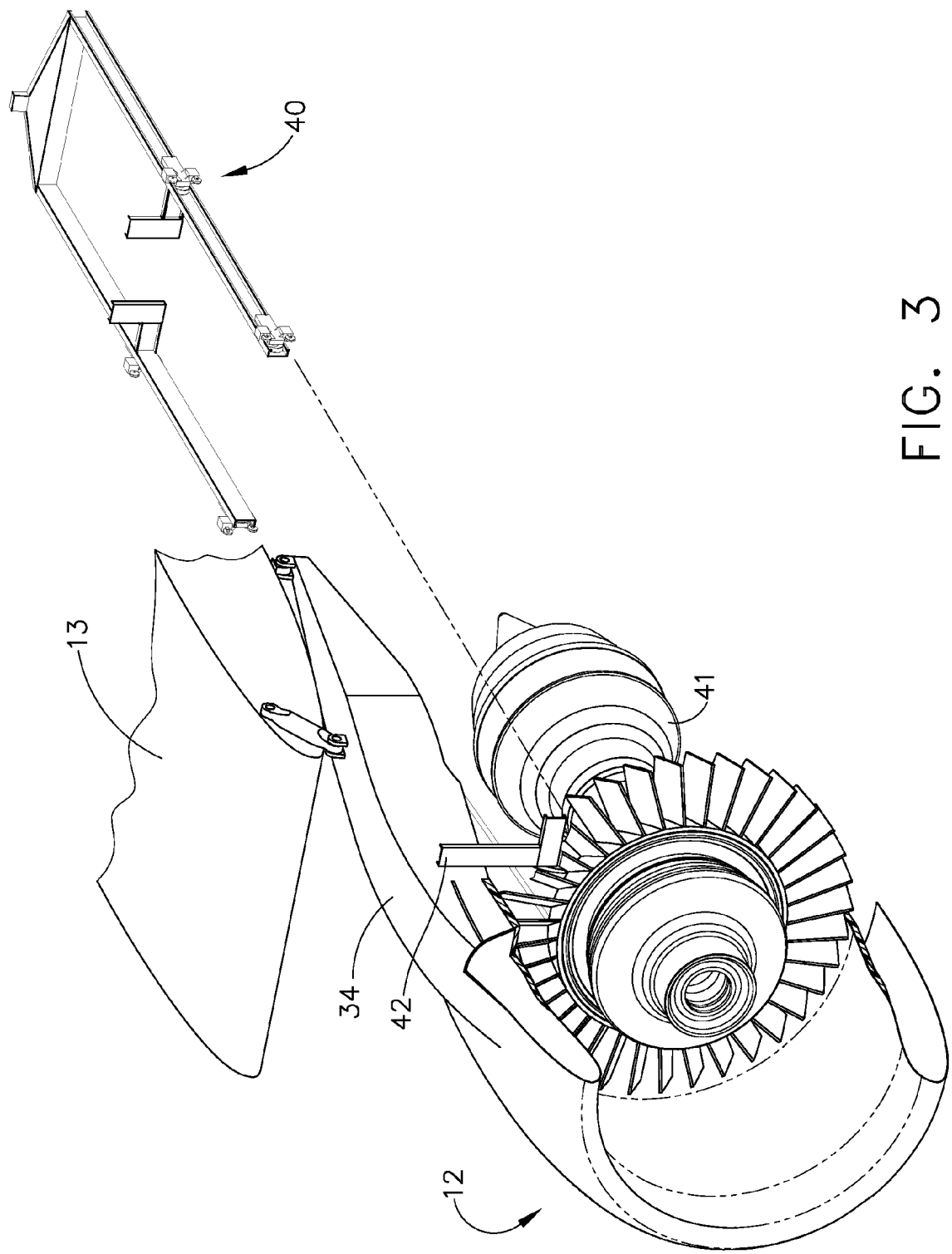
FIG. 3 is a perspective view, partly in section, illustrating the positioning of a frame assembly utilized to facilitate dismounting a gas turbine engine assembly from an associated aircraft.
Figure 4:
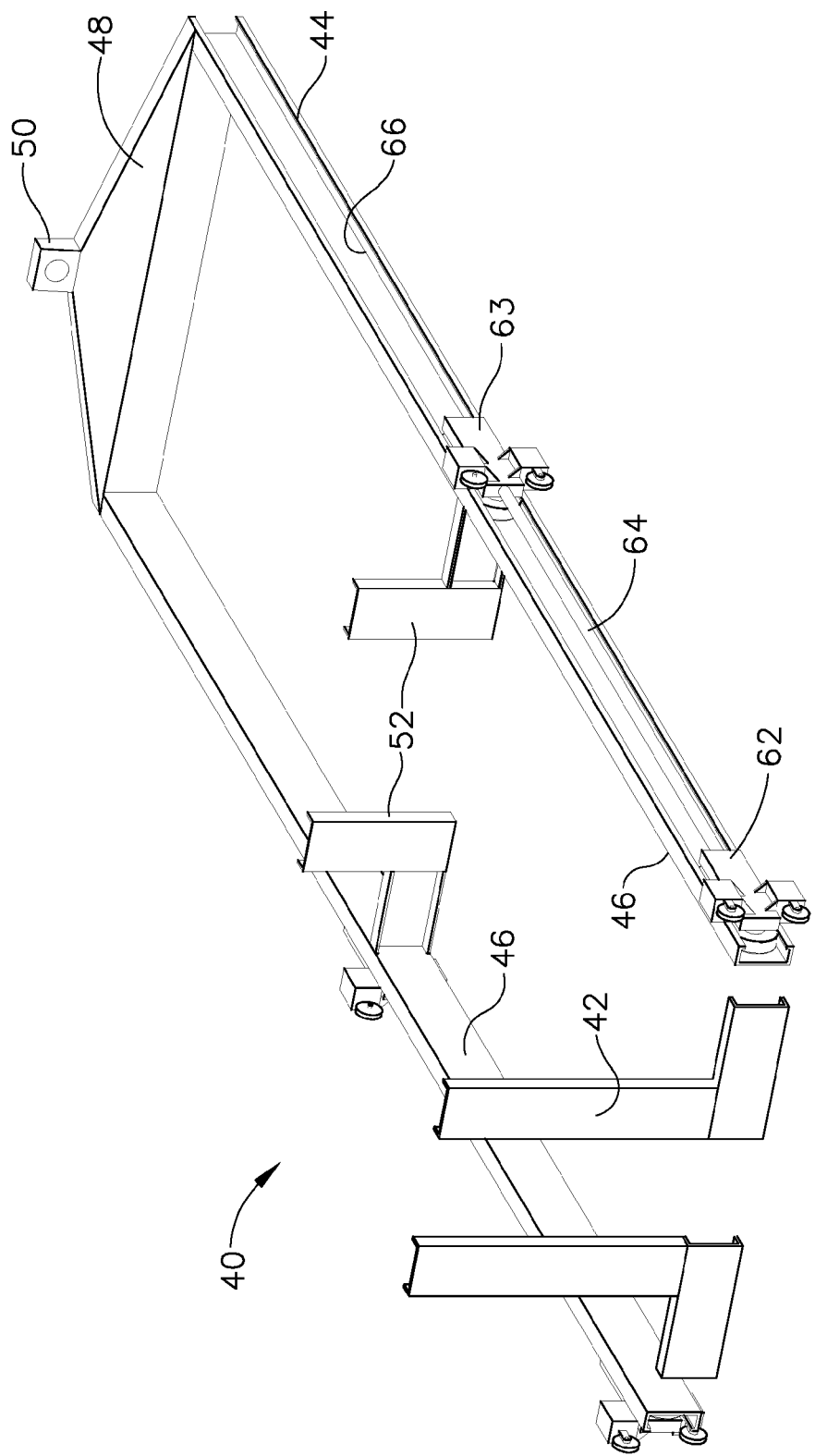
FIG. 4 is a perspective view of an exemplary frame assembly.

With reference to FIG. 3, an engine removal frame assembly 40 is installed to facilitate removal of a core engine 41. In an exemplary embodiment, the frame assembly 40 includes right- and left-side forward supports 42 which are selectively fixedly secured to opposing sides of a support member 34 (left side forward support shown, relative to an aft-looking-forward view). As used herein, "support member 34" refers to a structural element adapted to generally extend between a wing or other suitable appendage of an associated aircraft and the gas turbine engine assembly, and to which the gas turbine engine assembly is operationally mounted. In an exemplary embodiment, the term "support member 34" may comprise the support structure portion 16 of the monolithic structure 12 referenced above, but the embodiments disclosed herein are not so limited. With particular reference to FIG. 4, an exemplary engine removal frame assembly 40 includes a generally u-shaped frame member 44 capable of attachment to the right- and left-side forward supports 42 at the forward ends of side members 46. For simplicity, the frame member is described as being "u-shaped" although other arrangements of parts and configurations are with the scope of the present invention. The exemplary frame assembly 40 includes a rear cross member 48 including a rear hanger 50 adapted for engagement with the support member 34 or some other suitable aircraft structure. In an exemplary embodiment, the rear hanger may be capable of sharing a connection site, such as an aft wing mount, where the support member 34 is mounted to the associated aircraft.

Figure 5:
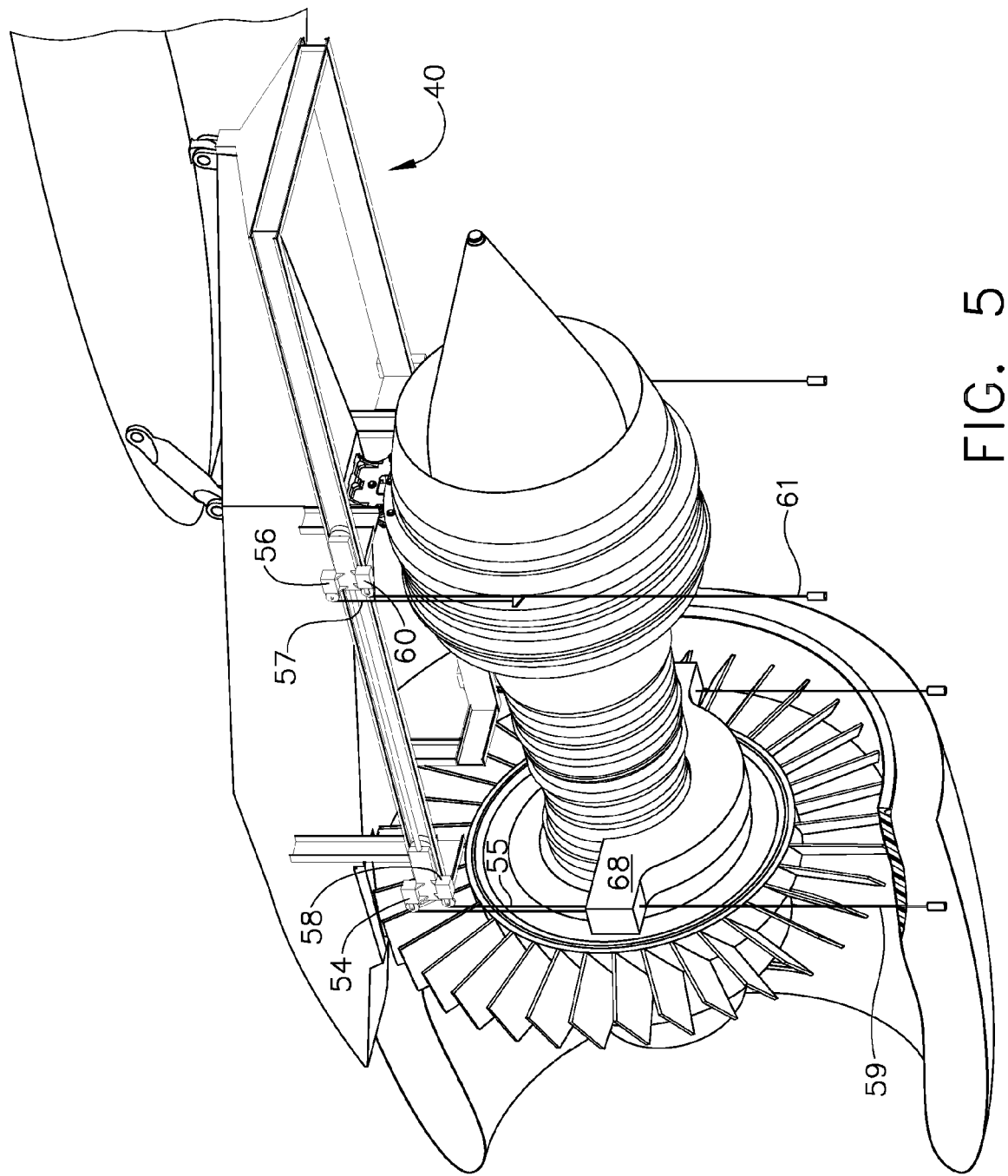
FIG. 5 is an aft-looking-forward perspective view of an exemplary frame assembly arrangement for facilitating dismounting a gas turbine engine assembly from an associated aircraft.
Figure 6:
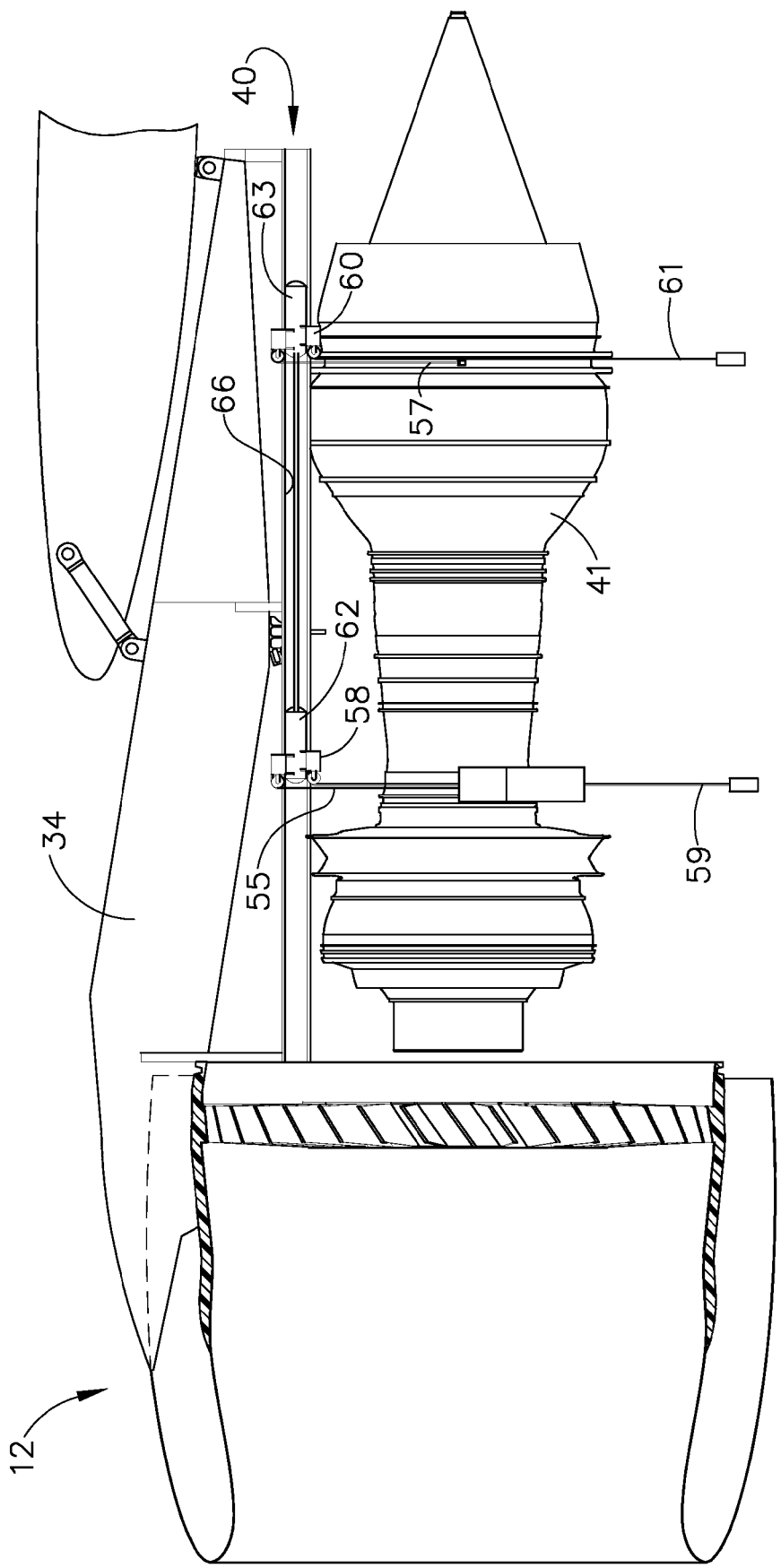
FIG. 6 is a side view, partly in section, illustrating rearward displacement of a gas turbine engine assembly while supported on a frame assembly.
Figure 7:
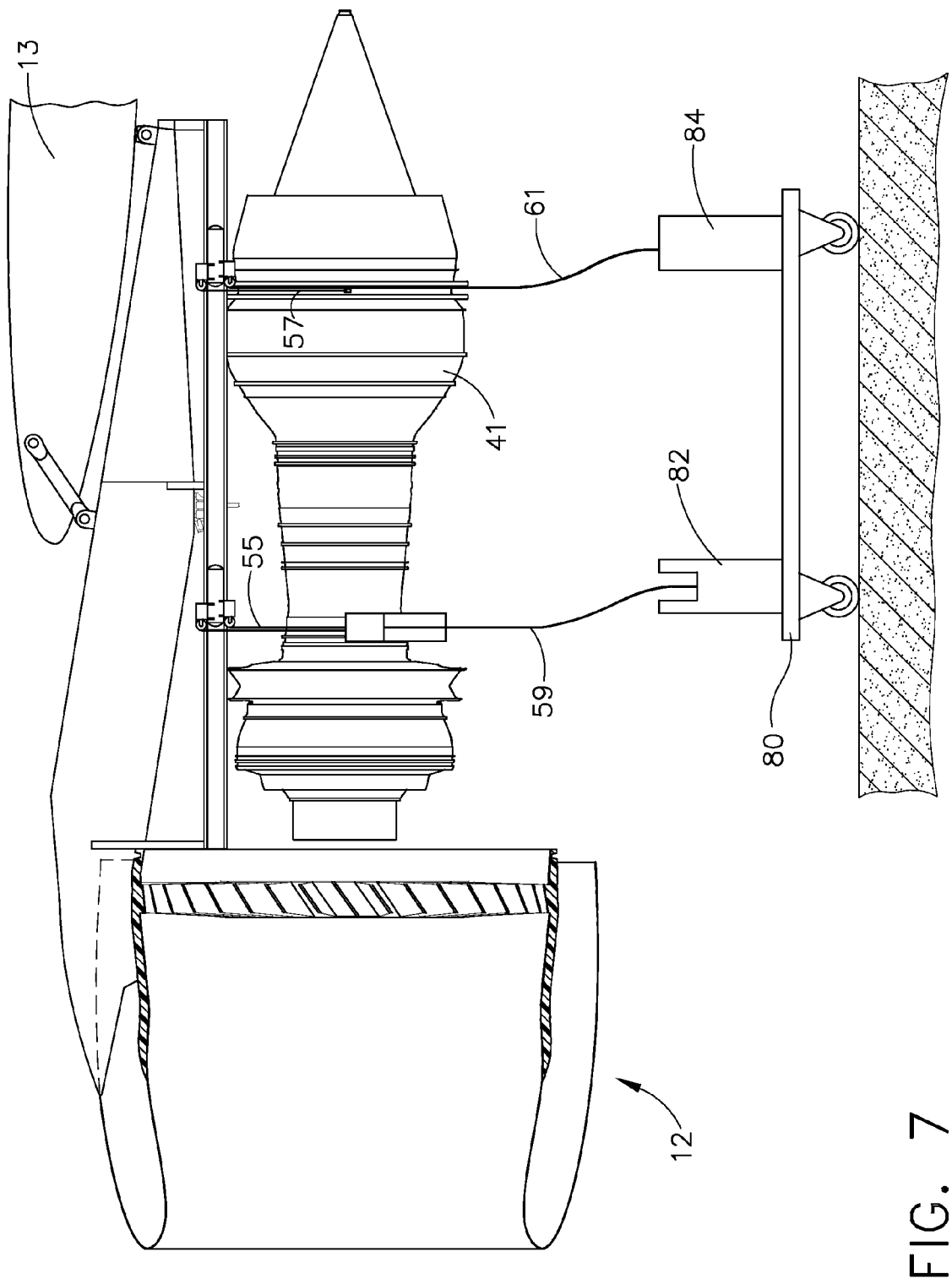
FIG. 7 is a side view, partly in section, illustrating attachment and alignment of a cart or trolley used to facilitate dismounting a gas turbine engine assembly from an associated aircraft.
Figure 8:
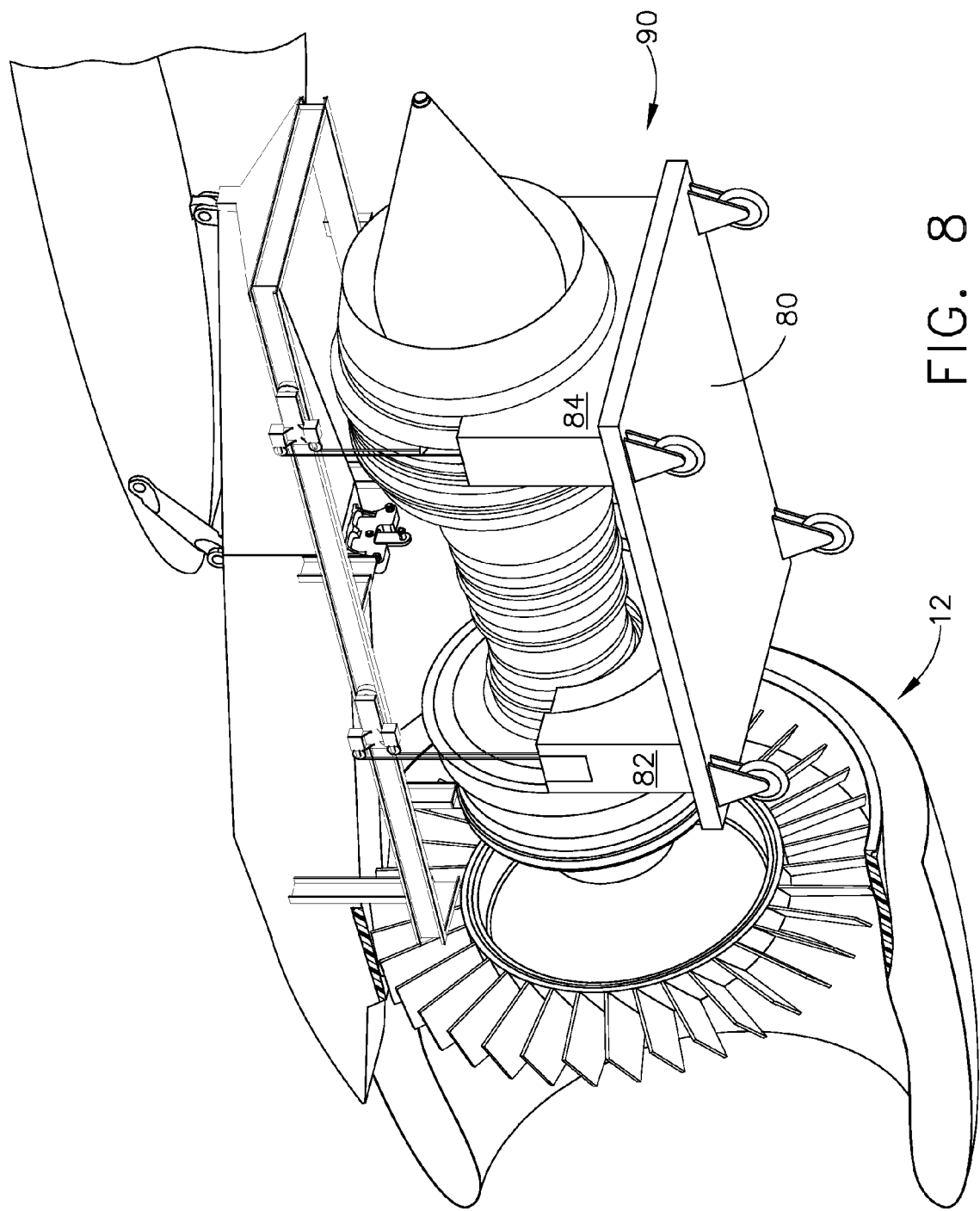
FIG. 8 is an aft-looking-forward perspective view illustrating a raised cart or trolley.
Figure 9:
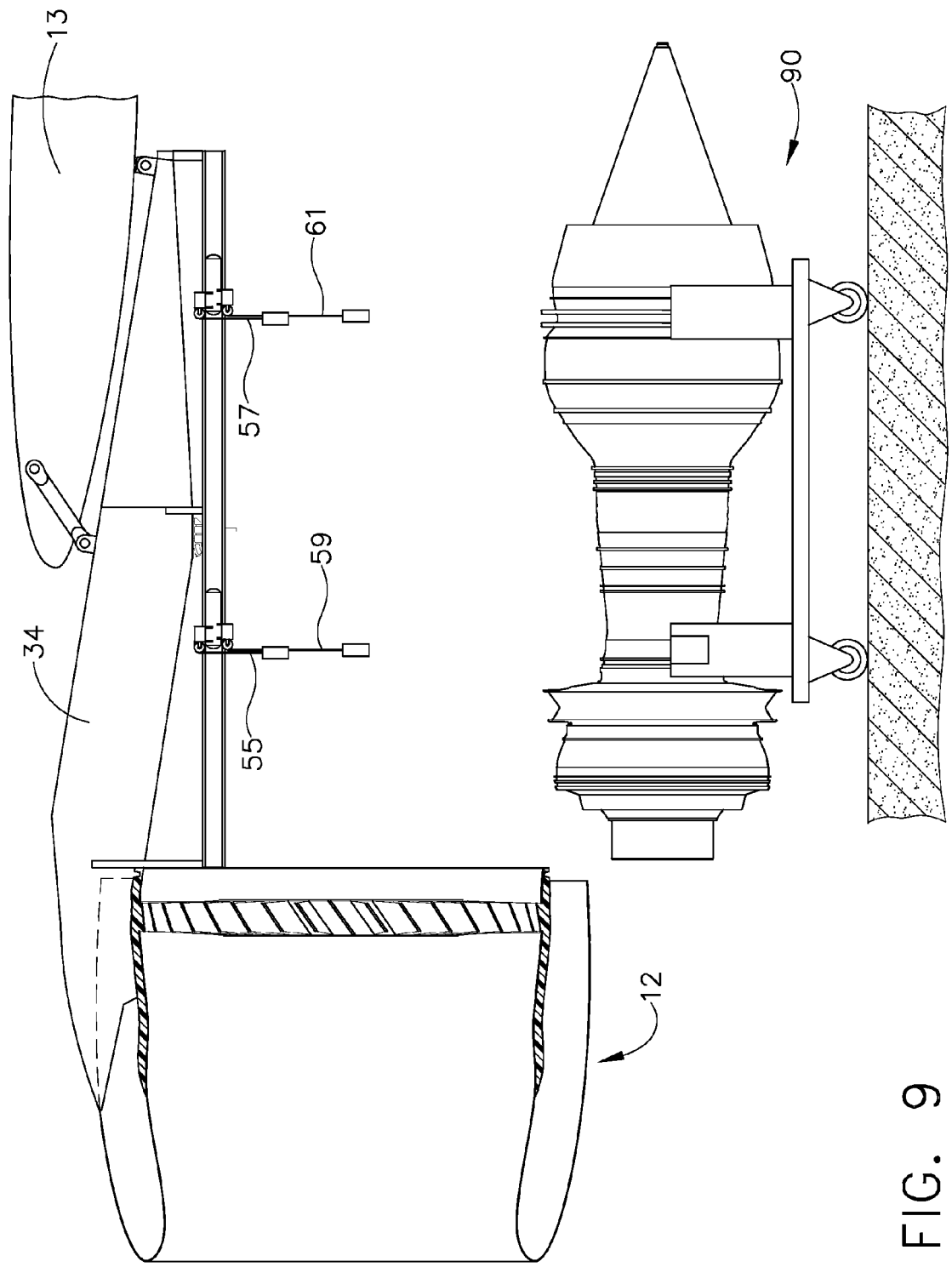
FIG. 9 is a side view, partly in section, showing a dismounted gas turbine engine assembly supported on a cart or trolley.

The frame member 44 may be an integral structure, or it may include separate, selectively joinable pieces. One or more pairs of optional right- and left-side mid supports 52, adapted for engagement with the support member 34 between the forward supports 42 and the rear hanger 50, may be carried on the frame member 44. With reference to FIG. 5, the engine removal frame assembly 40 includes a pair of forward engine winches 54 and associated forward engine cables 55, and a pair of rear engine winches 56 and associated rear engine cables 57. In an exemplary embodiment, the frame assembly also includes a pair of forward cart winches 58 and associated forward cart cables 59 and rear cart winches 60 and associated rear cart cables 61 as discussed in greater detail below. In an exemplary embodiment, right- and left-side forward and rear trucks, 62, 63, respectively, are joined with a connector bar 64 for coordinated movement along rails 66 of side members 46. In an exemplary embodiment, a cradle or other support member 68 may be carried on the forward engine cables 55 and used to support at least a portion of the core engine 41 as provided in greater detail below. In other exemplary embodiments, other supporting members or means may be used.

In an exemplary embodiment, the cart or trolley 80 may include braces or other structures, such as front brace 82 and rear brace 84 adapted to receive and support the core engine 41 on cart or trolley 80. In an exemplary embodiment, the cart or trolley 80 may include wheels. In an exemplary embodiment, the cart or trolley 80 is adapted to be supported by support member 34, and ultimately by the associated aircraft 13. The cart or trolley 80 may be designed so that its weight is readily supportable by the associated aircraft.

An exemplary method for removing a gas turbine engine from supported connection with a support member 34 and the associated aircraft 13 is provided. In an exemplary embodiment, if necessary, certain aero structures (cowls, fairings, thrust reversers) are moved or removed from the engine assembly. In an exemplary embodiment, the fan assembly 38 is at least partially disassembled. In an exemplary embodiment, the right and left-side forward supports 42 are selectively mounted to the support structure 34. The frame member 40 is positioned so that the right- and left-side members engage the respective forward support 42. The rear hanger 50 is connected to the aft wing mount, or other predetermined location in supported connection with the support structure 34. The right- and left-side mid supports 52, if present, are mounted in supported connection with the support structure 34. The forward and rear engine cables 55, 57, respectively and cradle 68, if present, are arranged to accept the weight of the core engine 41.

With particular reference to FIGS. 6-9, certain mounting assemblies are disengaged between the core engine 41 and the support structure 34 so that the weight of the core engine may be supported by engine cables 55, 57. For example, those with skill in the art will appreciate that various attachments, bolts, and mounting fixtures may be disengaged to allow rearward movement of the remainder of the gas turbine engine. Also, those with skill in the art will understand that gages or other devices may be utilized to indicate the loads borne by the mounting assemblies and/or the engine cables. The core engine 41 is then rearwardly displaced by travel of trucks 62, 63 along rails 66. Once the core engine is sufficiently displaced, the forward and rear cart winches 58, 60, respectively, may be utilized to raise the cart or trolley 80 to meet the core engine. In an exemplary embodiment, the forward and rear cart cables 59, 61, respectively, provide a self-alignment mechanism for the cart or trolley 80 as it is raised relative to the core engine 41. After the cart or trolley 80 has been adequately positioned in relationship to the core engine, the forward and rear engine cables 55, 57, respectively, may be released to transfer the weight of the core engine 41 to the cart or trolley 80 via the cart cables 59, 61. The cart or trolley is then lowered to the floor. The cart cables may be disengaged from the cart. The trolley/engine assembly 90 is then ready for transport to a service bay, shipping container, and the like.

In an exemplary embodiment, the frame assembly 40 may remain mounted to the support member 34. In an exemplary embodiment, the monolithic structure 12 remains mounted on the associated aircraft 13. A replacement core engine may be installed, or the core engine 41 may be reinstalled after service. In general, an installation method reverses the aforementioned sequence.

In an alternate exemplary embodiment, the cart or trolley 80 may be raised via the cart cables and fixed to the engine prior to rearward displacement. The weight of the cart or trolley may be supported along with the engine by support member 34. The core engine/trolley assembly may then be supported by appropriate means such as the cart cables, and displaced rearwardly as earlier described. The core engine/trolley assembly could then be lowered to the ground using the cart winches. In this alternate arrangement, separate engine cables and engine winches may be eliminated.

Thus, exemplary embodiments disclosed herein provide apparatuses and methods for mounting and dismounting a gas turbine engine assembly relative to a supporting structure while a monolithic structure, including a nacelle region, remains in supported connection with the associated aircraft. The core engine may thus be readily serviced or replaced using less shop floor space. Additionally, the core engine may be shipped in standard shipping containers using conventional shipping means.

This written description uses exemplary embodiments to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. Apparatus comprising:
   a frame assembly configured for mounting to support structure of an associated aircraft, the frame assembly comprising:
   a frame member:
   a movable assembly mounted in movable relationship to the frame member, wherein the movable assembly is movable between forward and rearward positions;
   a plurality of engine winches mounted in supported connection with the movable member, wherein each engine winch has an associated engine cable operably connected thereto; and
   a plurality of cart winches mounted in supported connection with the movable assembly, wherein each cart winch has an associated cart cable operably connected thereto;
   wherein the frame assembly is operable to movably support at least a portion of an associated aircraft engine.

2. The apparatus according to claim 1 further comprising: a cart operably connectable to the cart cables.

3. The apparatus according to claim 1 further including a cradle operably supported by at least one of the cart cables.

4. A method comprising:
   mounting a frame assembly in supported connection with a support member of an associated aircraft, wherein the frame assembly includes a frame member, a movable assembly mounted in movable relationship to the frame member, wherein the movable assembly is movable between forward and rearward positions, and a plurality of engine winches mounted in supported connection with the movable member, wherein each engine winch has an associated engine cable operably connected thereto;
   supporting the weight of at least a portion of an aircraft engine with the engine cables;
   moving the movable member relative to the frame member to displace the portion of the aircraft engine.

5. The method according to claim 4 further including:
   operably connecting a plurality of cart cables to a cart, wherein each cart cable is operably associated with a cart winch mounted in supported connection with the movable member;
   vertically displacing the cart upward to supportingly engage the portion of the aircraft engine utilizing the plurality of cart winches; and
   thereafter, transferring the weight of the portion of the aircraft engine to the cart to provide an engine/cart assembly; and
   thereafter, vertically displacing the engine/cart assembly downward.

6. Apparatus comprising:
   a frame assembly configured for mounting to support structure of an associated aircraft, the frame assembly comprising:
   a frame member:
   a movable assembly mounted in movable relationship to the frame member, wherein the movable assembly is movable between forward and rearward positions and wherein the frame member includes spaced right- and left-side longitudinally extending members comprising rails operable to guide movement of the movable assembly; and
   a plurality of engine winches mounted in supported connection with the movable member, wherein each engine winch has an associated engine cable operably connected thereto;
   wherein the frame assembly is operable to movably support at least a portion of an associated aircraft engine.

7. Apparatus comprising:
   a frame assembly configured for mounting to support structure of an associated aircraft, the frame assembly comprising:
   a frame member:
   a movable assembly mounted in movable relationship to the frame member, wherein the movable assembly is movable between forward and rearward positions; and
   a plurality of engine winches mounted in supported connection with the movable member, wherein each engine winch has an associated engine cable operably connected thereto;
   wherein the frame assembly is operable to movably support at least a portion of an associated aircraft engine; and
   wherein the frame member includes a rear hanger being configured for mounting in supported connection with the support member of the associated aircraft.

8. Apparatus comprising:
a frame assembly configured for mounting to support structure of an associated aircraft, the frame assembly comprising:
 a frame member:
 a movable assembly mounted in movable relationship to the frame member, wherein the movable assembly is movable between forward and rearward positions; and
 a plurality of engine winches mounted in supported connection with the movable member, wherein each engine winch has an associated engine cable operably connected thereto;
wherein the frame assembly is operable to movably support at least a portion of an associated aircraft engine; and
wherein the frame member includes:
 spaced right- and left-side longitudinally extending members,
 a rear hanger transverse to the longitudinally extending members,
 right- and left-side forward supports,
wherein the rear hanger and the right- and left-side forward supports are configured for mounting in supported connection with the support member of the associated aircraft, and
wherein the right- and left-side longitudinally extending members include rails operable to guide movement of the movable assembly.

9. The apparatus according to claim 8 further including:
a plurality of cart winches mounted in supported connection with the moveable assembly, wherein each cart winch has an associated cart cable operably connected thereto; and
a cart operably connectable to the cart cables.

10. The apparatus according to claim 9 further including:
a cradle mounted in supported connection with at least one cart cable, wherein the cradle is configured to supportingly engage the portion of the associated aircraft engine.

* * * * *